United States Patent [19]

Stazhevsky et al.

[11] Patent Number: 4,913,320

[45] Date of Patent: Apr. 3, 1990

[54] APPARATUS FOR METERING BULK MATERIALS

[76] Inventors: Stanislav B. Stazhevsky, ulitsa Derzhavina, 19, kv. 39; Evgeny I. Shemyakin, ulitsa Zolotodolinskaya, 8; Arestakes A. Kramadzhian, ulitsa Zheleznodorozhnaya, 8/I, kv. 329; Nikolai F. Stativko, ulitsa Dusi Kovalchuk, 18, kv. 61; Gennady N. Dyakov, ulitsa 1905 goda, 87, kv. 135; Genrikh K. Lev, ulitsa Leskova, 280, kv. 48; Vladimir K. Shanin, ulitsa Nikitina, 70, kv. 122; Ruslan B. Schipkov, ulitsa Udarnaya, 31, kv. 14, all of Novosibirsk, U.S.S.R.

[21] Appl. No.: 228,696

[22] PCT Filed: Aug. 25, 1987

[86] PCT No.: PCT/SU87/00087

§ 371 Date: May 31, 1988

§ 102(e) Date: May 31, 1988

[87] PCT Pub. No.: WO88/01590

PCT Pub. Date: Mar. 10, 1988

[30] Foreign Application Priority Data

Aug. 29, 1986 [SU] U.S.S.R. ............................... 4154081

[51] Int. Cl.⁴ .............................................. B67D 5/64
[52] U.S. Cl. .................................... 222/168; 222/239; 222/410; 222/274; 222/290
[58] Field of Search ............... 222/408, 415, 290, 344, 222/311, 317, 328, 342, 217, 237, 239, 168, 168.5, 315, 297, 345, 410, 273, 274

[56] References Cited

U.S. PATENT DOCUMENTS

| | | | |
|---|---|---|---|
| 746,410 | 12/1903 | Turner | 222/328 |
| 895,489 | 8/1908 | Morse | 222/239 |
| 2,189,018 | 2/1940 | Robinson | 222/311 |
| 2,546,300 | 3/1951 | Fritts | 222/342 |
| 2,767,884 | 10/1956 | Grass | 222/410 |
| 3,193,155 | 7/1965 | Hazen . | |
| 3,512,680 | 5/1970 | Krolopp | 222/410 |

FOREIGN PATENT DOCUMENTS

| | | |
|---|---|---|
| 401616 | 11/1974 | U.S.S.R. . |
| 598822 | 3/1978 | U.S.S.R. . |
| 990608 | 1/1983 | U.S.S.R. . |

OTHER PUBLICATIONS

S. P. Orlov, Dozirujuschie Ustroistva, 1960, Mashgiz, p. 110, FIG. 69.

Primary Examiner—H. Grant Skaggs
Attorney, Agent, or Firm—Burgess, Ryan and Wayne

[57] ABSTRACT

An apparatus comprises a vertically extending receiving hopper (1) having a guide funnel (2) in the bottom part thereof. A disk (3) having at least one discharge opening (4) is mounted between them. Above the discharge opening (4) is mounted a cut-off member (9) with a possibility of vertical and horizontal movement and has its surface extending in parallel with the disc (3) surface.

6 Claims, 2 Drawing Sheets

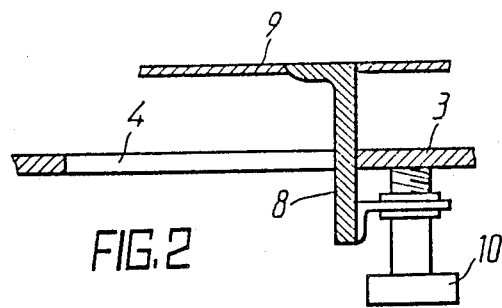
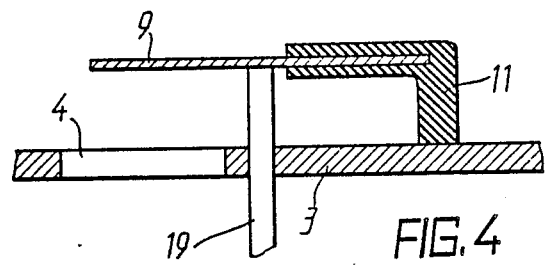
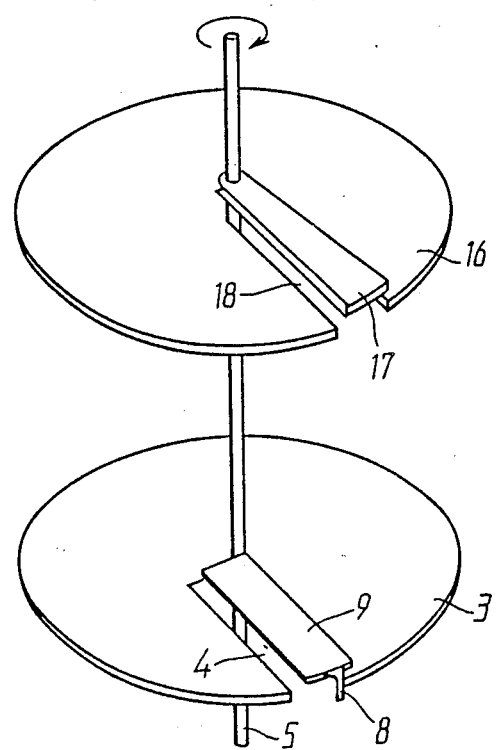

4,913,320

APPARATUS FOR METERING BULK MATERIALS

TECHNICAL FIELD

The invention relates to the field of metering of bulk materials, and more specifically, it deals with volumetric metering apparatuses, preferably for metering pulverulent materials.

BACKGROUND OF THE INVENTION

Known in the art are various types of volumetric metering apparatuses for bulk materials. Thus known in the art is an apparatus (SU, A, 598822) comprising a vertically extending receiving hopper having a guide funnel in the bottom part thereof and a disc with a discharge opening mounted therebetween for rotation about vertical axis. Rotation of the disc progressively disrupts equilibrium of material over the discharge opening within a so called vault or bridge, and the material moves under gravity through the discharge opening into the guide funnel.

This apparatus is deficient in a low metering accuracy because dimensions of the vaults, hence quantity of the material passing through the discharge opening per unit of time largely vary and are probabilistic.

Also known in the art is an apparatus (SU, A, 401616) comprising a vertically extending receiving hopper having a disc with a discharge opening provided in the bottom part thereof for rotation about vertical axis and a tripping knife mounted above the discharge opening in an inclined position with respect to the disc surface.

This apparatus is deficient in a low metering accuracy because the tripping knife overcoming resistance of the bulk material would deform it thus causing irreversible and uncontrollable changes in density.

In addition, the inclined surface of the tripping knife initiates settling of the material in the hopper over the discharge opening thus resulting in inadvertent discharges of the material which is also detrimental to the metering accuracy.

SUMMARY OF THE INVENTION

An object of the present invention is to eliminate the above-mentioned disadvantages of the known apparatuses.

The main object of the present invention is to provide an apparatus for volumetric metering of bulk materials construction arrangement of which would make it possible to ensure uniform discharge of the material from the receiving hopper and its stable density at the outlet of the hopper with a controllable output.

The main object is accomplished by that in an apparatus for metering bulk materials, comprising a vertically extending receiving hopper having a guide funnel in the bottom part thereof and a disc with at least one discharge opening mounted therebetween for rotation about vertical axis, according to the invention, a cut-off member is provided immediately above the discharge opening of the disc, which is mounted for vertical and horizontal movement and has its surface extending in parallel with the disc surface.

The cut-off member preferably comprises a plate secured to an arm which is movably connected to the disc.

Another embodiment of the invention provides that the apparatus can have an auxiliary disc and an auxiliary cut-off member which are mounted above the main disc and coaxially therewith, the cut-off member completely covering the discharge opening of the auxiliary disc.

The auxiliary disc is preferably movably mounted on a shaft. This construction of the apparatus makes it possible to ensure uniform escape of a material with a constant density and pre-set intensity of flow.

The invention essentially resides in that a cut-off member in the form of a plate extending in parallel with the disc surface ensures, during its combined rotation with the disc, continuous separation from the mass of a bulk material available in the hopper and remaining static of a layer of a constant thickness which is equal to the distance from the cut-off member surface to the surface of the disc, this layer moving uniformly under gravity only through the discharge opening and into the guide funnel. Any power action upon the material on the part of the cut-off member is thus eliminated thereby precluding volumetric deformation of the material and ensuing fluctuations of density.

Mounting the cut-off member on an arm which is movably connected to the disc makes it possible to control the output of metering by varying the height of the cut-off member over the disc.

The provision of the horizontally movable cut-off member makes it possible to avoid inadvertent escape of the material from the hopper.

In addition, the provision of an auxiliary disc and an auxiliary cut-off member mounted coaxially with the main disc allows a stable density of the material to be maintained above the main disc independent of the height of a column of material in the hopper.

The fact that the auxiliary disc is movably mounted on a shaft makes it possible to avoid rotation of material over the main disc relative to the walls of the receiving hopper.

The use of the invention allows accuracy of volumetric metering of pulverulent materials to be improved with a probability of up to ±0.4–±0.6% depending on kind and uniformity of the material.

BRIEF DESCRIPTION OF THE DRAWINGS

The invention will now be described with reference to specific embodiments illustrated in the accompanying drawings, in which:

FIG. 2 is a sectional view taken along line II—II in FIG. 1;

FIG. 3 is an embodiment of a metering assembly;

FIG. 4 is another embodiment of a metering assembly.

BEST MODE FOR CARRYING OUT THE INVENTION

Figure 1:
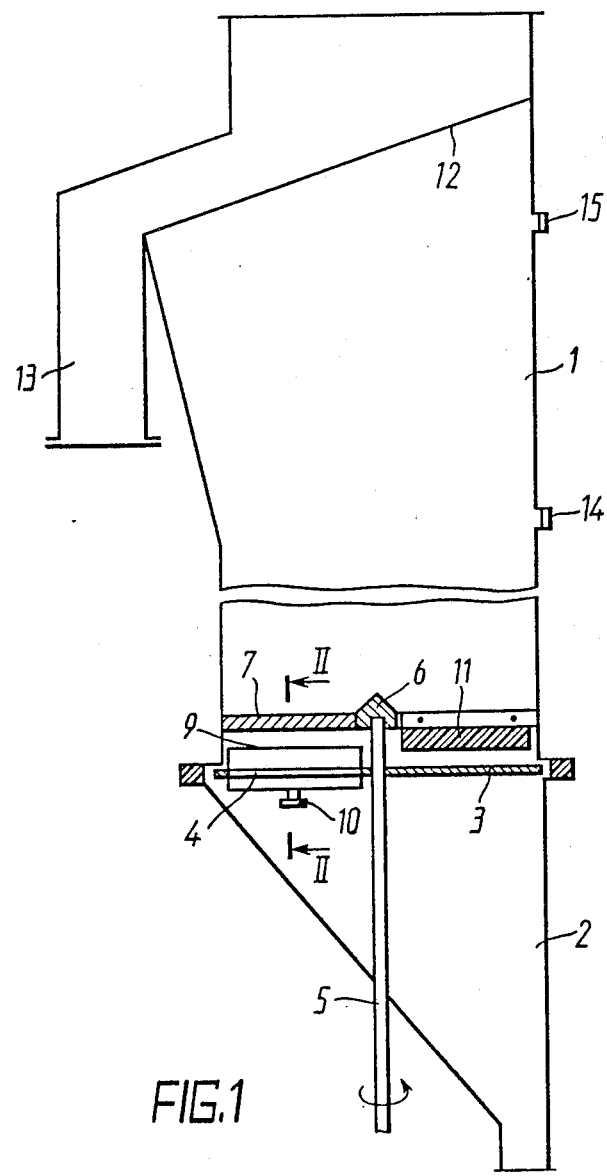
FIG. 1 is an apparatus for metering bulk materials according to the invention in an axial section.

An apparatus for metering bulk materials (FIG. 1) according to the invention comprises a receiving hopper 1 having a guide funnel 2 secured to its lower end. A disc 3 is provided between them coaxially with the receiving hopper and has at least one discharge opening 4. The disc is mounted on a shaft 5 having its upper end journalled in a bearing 6 fixed by means of ridges 7 and its lower end connected to a drive (not shown in the drawings). Mounted in guide slots of an arm 8 over the discharge opening 4 (FIG. 2) in parallel with the disc 3 is a horizontally movable cut-off member 9 in the form of a plate. The cut-off member is vertically movable by a screw 10. A cleaner 11 for cleaning the cut-off member 9 made of an elastic material is attached to the ridge 7 (FIG. 1). The inlet zone of the receiving hopper 1 has a grate 12 for separating extraneous matter from the material being metered and a collector 3 for extraneous matter communicating therewith. The grate 12 is in the form of a frame having parallel taut strings. A lower level sensor 14 and an upper level sensor 5 are mounted on the casing of the receiving hopper 1.

FIG. 3 shows a metering assembly having an auxiliary disc 16 with a cut-off member 17 which completely covers a discharge opening 18, the disc and cut-off member being mounted above the main disc 3 and on its shaft 5. The auxiliary disc 16 and the cut-off member 17 may be fixed in a pre-set position on the shaft 5 by an appropriate known means.

FIG. 4 shows another embodiment of a metering assembly having the cut-off member in the form of a disc-like plate mounted on a vertical shaft 19 above the discharge opening 4 of the disc 3. The cleaner 11 of the cut-off member 9 is mounted on the disc 3 outside the discharge opening 4 and comprises a fork that touches the upper and lower sides of the cut-off member 9.

The apparatus shown in FIGS. 1 and 2 operates in the following manner. Bulk material is fed to the grate 12, passes between its strings and settles down under gravity on the surface of the disc 3 to fill-up the receiving hopper 1. Extraneous matter that may be present in the material and that is of a size greater than the distance between the strings of the grate 12 will roll down along the incline surface of the grate into the collector 13.

The material will not escape from the receiving hopper 1 when the disc 3 is stationary as the distance from the cutting edge of the cut-off member 9 to the edge of the discharge opening 4 does not exceed the size of the ultimate bridging clearance in the bulk material. The distance is preliminarily set by horizontally moving the cut-off member 9 in the guide slots of the arm 8. During rotation of the disc 3 the bulk material over disc will remain stationary and will be held stationary by forces of internal friction within the material, forces of external friction between the material and the walls of the receiving hopper, and by resistance of the ridges 7. As a result, the cut-off member 9, which rotates together with the disc 3, will cut-off and separate with its surface from the stationary mass of the material in the hopper 1 a layer of a thickness which is equal to the distance from the cut-off member 9 to the surface of the disc 3. The material of this layer moves under the cut-off member 9 which takes-up pressure on the part of the overlying mass thereby relieving the layer. The layer of the material being metered will move freely, under gravity only, first into the discharge opening 4 and then into the guide funnel 2. Back pressure of the material within the moving layer during rotation of the disc 3 by the arm 8 is prevented by preliminarily setting the distance from the latter to the cutting edge of the cut-off member 9.

During rotation of the disc 3 the discharge opening 4 moves along the perimeter of the receiving hopper 1 thus cutting-off during one revolution a layer of a constant thickness from the mass of the bulk material. The material discharged from the receiving hopper 1 is replaced by the overlying material which moves down under gravity onto the disc 3.

Maintaining the level of the material being metered within pre-set limits of its level in the receiving hopper 1 is necessary in order to stabilize density of the material immediately above the disc 3, and this is ensured by means of the sensors 14 and 15.

To avoid eventual fluctuations of density of the material above the disc 3 which might be caused by cyclical changes in the height of a column of the material above the disc within the limits of the upper and lower levels, it is preferred that the metering assembly be provided with the auxiliary disc 16 with the cut-off member 17 (FIG. 3). In this case the escape of the material through the discharge opening 4 from the lower part of the receiving hopper 1 which is defined by the auxiliary disc 16 initiates continuous admission into this zone of the material from the upper part of the receiving hopper 1 through the discharge opening 18. With a distance from the auxiliary disc 16 to the cut-off member 17 somewhat greater (by 5–10%) than the distance between the main disc 3 and the cut-off member 9 (this distance is set preliminarily by vertically moving the cut-off member 17 along the shaft 5), the material escaping from the lower part of the receiving hopper 1 will be completely replaced by the material admitted from the top. The surplus material will freely slip down under the cut-off member 17. As a result, the height of a column of bulk material supported by the disc is steadily maintained at the level of the auxiliary disc 16. The material in this zone will not be acted upon by the overlying material available in the upper part of the reciving hopper 1 since the pressure of this material is fully taken-up by the auxiliary disc 16 and cut-off member 17. The choice of the distance from the disc 3 to the auxiliary disc 16 eliminates rotation of the bulk material over the disc 3 with respect to the walls of the receiving hopper 1 (this distance is pre-set by vertically moving the auxiliary disc 16 along the shaft 5).

Filament-like mechanical impurities that might be present in the material and that might hang from the cutting edge of the cut-off member 9 are regularly removed therefrom by the cleaner 11 (FIG. 1). In a number of applications, to avoid cyclical covering of the discharge opening 4 by the cut-off member 9 and also to allow the lower side of the cut-off member 9 to be cleaned from fine inclusions, the cut-off member 9 is preferably made in the form of the disc-like plate (FIG. 4) mounted on the vertical shaft 19 above the discharge opening 4, the cleaner 11 being made in the form of a fork radially embracing the cut-off member 9 and mounted outside the discharge opening 4.

The output of this metering apparatus is proportional to the distance from the cut-off member 9 to the surface of the disc 3 and to the disc speed. The output may be controlled by vertically moving the cut-off member 9 or by varying the speed of the disc 3.

INDUSTRIAL APPLICABILITY

The invention may be most efficiently used in the bakery for metered supply of flour to dough mixers so as to enhance quality of finished products and save starting materials.

We claim:

1. An apparatus for metering bulk materials comprising a vertically extending receiving hopper (1) having a guide funnel (2) in the bottom part thereof and at least one disk (3) with at least one discharge opening (4) extending along a substantial distance of a disk radius, the disk mounted for rotation about a vertical axis, between the hopper (1) and guide funnel (2); a cut-off member (9) arranged immediately above the discharge opening (4) of the disk (3), the cut-off member 89) is arranged vertically movable in relation to the disk and for horizontal movement with the disk and has a surface extending in parallel with the surface of disk (3).

2. An apparatus according to claim 1, wherein the cut-off member (9) comprises a plate mounted on an arm (8) movably connected to the disk (3).

3. An apparatus according to claim 2 comprising an auxiliary disk (16) having a discharge opening (18), arranged immediately above the opening (18) and a cut-off member (17) in auxiliary disk (16), having a surface extending in parallel with the surface of the auxiliary disk (16); the auxiliary disk (16) and cut-off member (18) being rotatably mounted coaxially above the disk (3); the surface of the cut-off member (17) being parallel to the surface of auxiliary disk (16) completely covering the discharge opening (18) of the auxiliary disk (16).

4. An apparatus according to claim 3 wherein the auxiliary disk (16) is movably mounted on a shaft.

5. An apparatus according to claim 1 comprising an auxiliary disck (16) having a discharge opening (18) and a cut-off member (17), arranged immediately above the opening (18) in auxiliary disk (16), having a surface extending in parallel with the surface of the auxiliary disk (16); the auxiliary disk (16) and cut-off member (18) being rotatably mounted coaxially above the first name disk (3); the surface of the cut-off member (17) being parallel to the surface of auxiliary disk (16) completely covering the discharge opening (18) of the auxiliary disk (16).

6. An apparatus according to claim 5, wherein the auxiliary disk (16) is movably mounted on a shaft.

* * * * *